Feb. 13, 1962     A. D. McELROY ETAL     3,021,190

ALKALI METAL DERIVATIVES OF DECABORANE

Filed Jan. 25, 1956

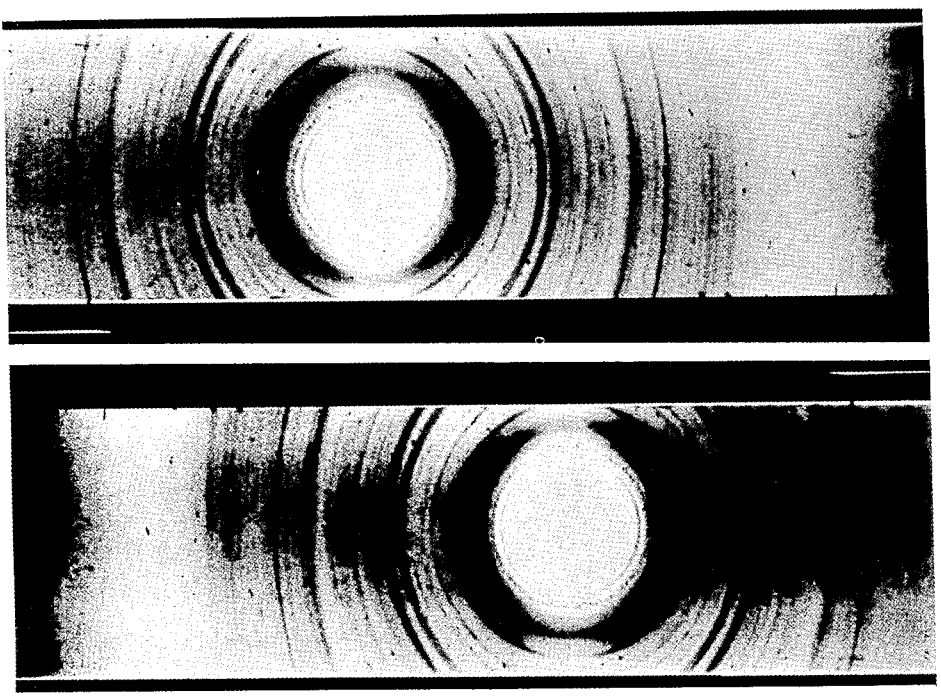

| LINE NO | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $d/\theta$ | 6.31 | 5.33 | 4.81 | 4.34 | 3.76 | 3.20 | 2.72 | 2.56 | 2.40 | 2.27 | 2.10 | 1.99 | 1.94 | 1.89 |
| INTENSITY | S | S | M | W | $VS^b$ | S | M | W | VW | $S^b$ | $S^b$ | VW | W | VW |

| LINE NO | 15 | 16 | 17 | 18 | 19 | 20 | 21 | 2 | 23 | 24 | 25 | 26 | 27 | 28 |
|---|---|---|---|---|---|---|---|---|---|---|---|---|---|---|
| $d/\theta$ | 1.81 | 1.72 | 1.69 | 1.63 | 1.52 | 1.48 | 1.45 | 1.412 | 1.372 | 1.260 | 1.244 | 1.214 | 1.194 | 1.156 |
| INTENSITY | W | VW | VW | W | $M^b$ | W | VW | W | M | VW | VW | W | W | $VW^d$ |

VS-VERY STRONG    S-STRONG    M-MEDIUM    W-WEAK
VW-VERY WEAK    b-BROAD    d-DIFFUSED

X-RAY DIFFRACTION PATTERN AND CHART
OF $d/\theta$ VALUES FOR COMPOUND $Na\ B_{10}H_{14}$ Albert D. McElroy
Joseph P. Nigon
         INVENTORS BY Neal J. Mosely
    their Attorney

United States Patent Office 3,021,190
Patented Feb. 13, 1962

3,021,190
ALKALI METAL DERIVATIVES OF DECABORANE
Albert D. McElroy, Evans City, Pa., and Joseph P. Nigon, Washington, D.C., assignors to Callery Chemical Company, Pittsburgh, Pa., a corporation of Pennsylvania
Filed Jan. 25, 1956, Ser. No. 561,375
7 Claims. (Cl. 23—14)

This invention relates to new compositions of matter referred to as alkali metal derivatives of decaborane having the general formula $MB_{10}H_{14}$ where M is an alkali metal such as sodium, potassium or lithium. It also relates to a method of preparing these new compositions of matter and more particularly to a method of preparing the sodium derivative of decaborane having the formula $NaB_{10}H_{14}$.

Compositions of matter containing a metal, boron and hydrogen which have been reported in the literature include the borohydrides, such as sodium borohydride, $NaBH_4$; substituted borohydrides, such as sodium trimethoxyborohydride, $NaHB(OCH_3)_3$; and the so-called metal borane salts, such as $K_2B_2H_6$, $Na_2B_4H_{10}$ and $K_2B_5H_9$, reported by Stock and co-workers. The borohydrides may be considered as adducts of the metal hydride and diborane, $B_2H_6$. The substituted borohydrides may be considered to be derived from the metal hydride and a substituted borane. The metal borane salts prepared by Stock et al. in 1935 were derived from various boranes and a metal amalgam. There is no reference in the literature to decaborane compounds such as $NaB_{10}H_{14}$ which are prepared from an alkali metal hydride and decaborane.

It is an object of this invention to provide new compositions of matter referred to herein as the alkali metal derivatives of decaborane.

Another object is to provide a method for preparing these new alkali metal derivatives of decaborane.

A further object is to provide a method of preparing the sodium derivative of decaborane having the formula $NaB_{10}H_{14}$.

Other objects will become apparent throughout the following specification and appended claims.

These new compositions of matter and methods for preparing them will be more fully disclosed hereinafter and the novelty thereof will be particularly pointed out and distinctly claimed.

In the accompanying drawing, there is shown a photograph of an X-ray diffraction pattern of the new compounds $NaB_{10}H_{14}$ produced by this process.

This invention is based upon the discovery that an alkali metal hydride and decaborane will react with hydrogen at slightly above room temperature and superatmospheric pressure in the presence of a simple or complex ether as a solvent. The product of this reaction is a white solid having the general empirical formula $MB_{10}H_{14}$ where M is the alkali metal.

In one experiment, $NaB_{10}H_{14}$ was prepared as follows: 2.8 g. of decaborane, 1.0 g. of sodium hydride and 25 ml. of diethyl ether were placed in a stainless steel pressure reactor of conventional design and pressurized to 800 p.s.i.g. with hydrogen. The reactor was rotated to stir the contents and heated at 48–50° C. for about 12 hours. When the reactor was opened, the solvent was evaporated by evacuation. The white reaction product remaining was purified by extraction with liquid ammonia followed by evaporation of the ammonia. The reaction product thus obtained was a white crystalline solid having an elemental analysis corresponding to $NaB_{10}H_{14}$. This compound was characterized by its solubility in diethyl ether, liquid ammonia and water and may be recrystallized from any of these solvents without change in composition.

This compound was further characterized by partial hydrolysis with water according to the equation:

$$NaB_{10}H_{14} + 3H_2O \rightarrow NaOH + B_{10}H_{12}(OH)_2 + 2.5H_2$$

This compound was still further characterized by its unique X-ray pattern, a photograph of which is shown in the attached drawing.

By a similar procedure starting with potassium hydride or lithium hydride and decaborane, it is possible to obtain the corresponding potassium and lithium derivatives of decaborane. Other solvents can also be used if desired such as any simple lower alkyl ether or an ethyleneglycol dialkyl ether having the general formula $RO(C_2H_4O)_nR$ where R is a lower alkyl radical and $n$ is an integer from 1 to 4 such as diethyleneglycol dimethyl ether. However, diethyl ether is preferred because of its low cost and low boiling point.

The alkali metal derivatives of decaborane prepared in the manner described are excellent reducing agents— e.g., reaction with dimethyl sulfate will produce sulfur dioxide and reaction with organic compounds will result in the reaction of functional groups which are reducible by decaborane. They also provide a water soluble form of decaborane for carrying out reactions of decaborane in aqueous solutions. These compounds are highly toxic in aqueous solution when taken internally and are useful as insecticides and rodenticides—for example, an aqueous solution of $NaB_{10}H_{14}$ when applied to an anthill results in rapid destruction of the ants. This compound can also be incorporated in other aqueous insecticidal compositions if desired. These derivatives can be further reacted with an alkyl halide to produce mono-substituted alkyl derivatives of decaborane as for example, monoethyl decaborane which compound has known use as a high energy fuel.

Having thus described this invention fully and completely as required by the patent statutes and included what is now considered to be one of its best embodiments, it should be understood that other variations are possible and that within the scope of the appended claims this invention may be practiced otherwise than as specifically described.

What is desired to be claimed and secured by Letters Patent of the United States is:

1. As a new composition of matter, an alkali metal derivative of decaborane having the general formula $MB_{10}H_{14}$ where M is an alkali metal selected from the class consisting of sodium, potassium and lithium.

2. As a new composition of matter, the sodium derivative of decaborane having the empirical formula $NaB_{10}H_{14}$.

3. A method of preparing alkali metal derivatives of decaborane having the general formula $MB_{10}H_{14}$ where M is the alkali metal, which comprises reacting an alkali metal hydride and decaborane in the presence of hydrogen and an ether selected from the class consisting of lower alkyl simple ethers and ethylene glycol dialkyl ethers, said glycol ethers having the general formula $RO(C_2H_4O)_nR$ where R is a lower alkyl radical and $n$ is an integer from 1 to 4, at a temperature slightly above room temperature and superatmospheric pressure and recovering the $MB_{10}H_{14}$ formed.

4. A method of preparing a sodium derivative of decaborane having the formula $NaB_{10}H_{14}$ which comprises reacting sodium hydride and decaborane in the presence of hydrogen and an ether selected from the class consisting of lower alkyl simple ethers and ethylene glycol dialkyl ethers, said glycol ethers having the general formula $RO(C_2H_4O)_nR$ where R is a lower alkyl radical and $n$ is an integer from 1 to 4, at a temperature slightly above room temperature and superatmospheric pressure and recovering the resulting $NaB_{10}H_{14}$.

5. A method according to claim 4 in which the reaction is carried out at a pressure of about 800 p.s.i.g. and a temperature of about 50° C.

6. A method according to claim 3 in which the reaction product formed is purified by extraction with liquid ammonia and subsequent evaporation of the ammonia.

7. A method of preparing the sodium derivative of decaborane having the empirical formula $NaB_{10}H_{14}$ which comprises reacting decaborane with sodium hydride in diethyl ether under a hydrogen pressure of about 800 p.s.i.g. at a temperature of about 50° C., evaporating the ether, extracting the solid reaction product with liquid ammonia and evaporating the ammonia to recover the solid $NaB_{10}H_{14}$ formed.

References Cited in the file of this patent

Schlesinger et al.: J.A.C.S., vol. 75, page 187 (1953).
Sidwick: "Chemical Elements and Their Compounds," vol. I, pages 346–349 (1950), Oxford Univ. Press, London.